United States Patent [19]
Trousdale et al.

[11] 3,887,796
[45] June 3, 1975

[54] DIGITAL INCREMENTAL CONTROL SYSTEM

[75] Inventors: Robert B. Trousdale, Santa Ana; Eugene Seid, Los Angeles; William E. Smith, Anaheim, all of Calif.

[73] Assignee: California Computer Products, Inc., Anaheim, Calif.

[22] Filed: Oct. 26, 1964

[21] Appl. No.: 406,523

[52] U.S. Cl.................................. 235/151; 318/696
[51] Int. Cl...................... G06k 15/22; G06k 17/00
[58] Field of Search ............ 318/20, 110, 597, 696, 318/685; 235/151, 151.1, 15.11, 197, 150.53, 152; 33/18, 14, 17; 178/3

[56] References Cited
UNITED STATES PATENTS

| | | | |
|---|---|---|---|
| 2,912,160 | 11/1959 | Magnuson et al. | 235/150.53 X |
| 2,922,940 | 1/1960 | Mergler | 235/151.11 X |
| 3,002,115 | 9/1961 | Johnson et al. | 318/20.110 X |
| 3,007,096 | 10/1961 | Trip | 318/20.110 X |
| 3,110,865 | 11/1963 | Scuitto | 318/20.110 X |
| 3,184,663 | 5/1965 | Mergler | 318/696 X |
| 3,204,132 | 8/1965 | Benaglio et al. | 318/20.110 X |
| 3,246,125 | 4/1966 | Mergler | 318/20.110 X |
| 3,254,203 | 5/1966 | Kveim | 235/168 X |
| 3,286,085 | 11/1966 | Rado | 318/20.110 X |
| 3,299,432 | 1/1967 | Cutler | 33/1 |
| 3,308,279 | 3/1967 | Kelling | 318/20.110 X |
| 3,349,229 | 10/1967 | Evans | 235/151.11 |
| 3,805,138 | 4/1974 | Hilker | 318/685 X |

Primary Examiner—Eugene G. Botz
Attorney, Agent, or Firm—Fraser and Bogucki

[57] ABSTRACT

An incrementally advanced open loop output system for data processing applications is presented. The system maximizes average data plotting rate by plotting at the maximum rate at which incremental stepping mechanisms can be reversed without irregularities during portions of plots where the incremental stepping mechanisms are subject to reversals and thereby limited by the acceleration characteristics of the plotting mechanisms, and by plotting at higher rates during portions of the plot where the incremental stepping mechanisms are not subject to reversals and thereby less limited by the acceleration characteristics of the plotting mechanisms.

29 Claims, 7 Drawing Figures

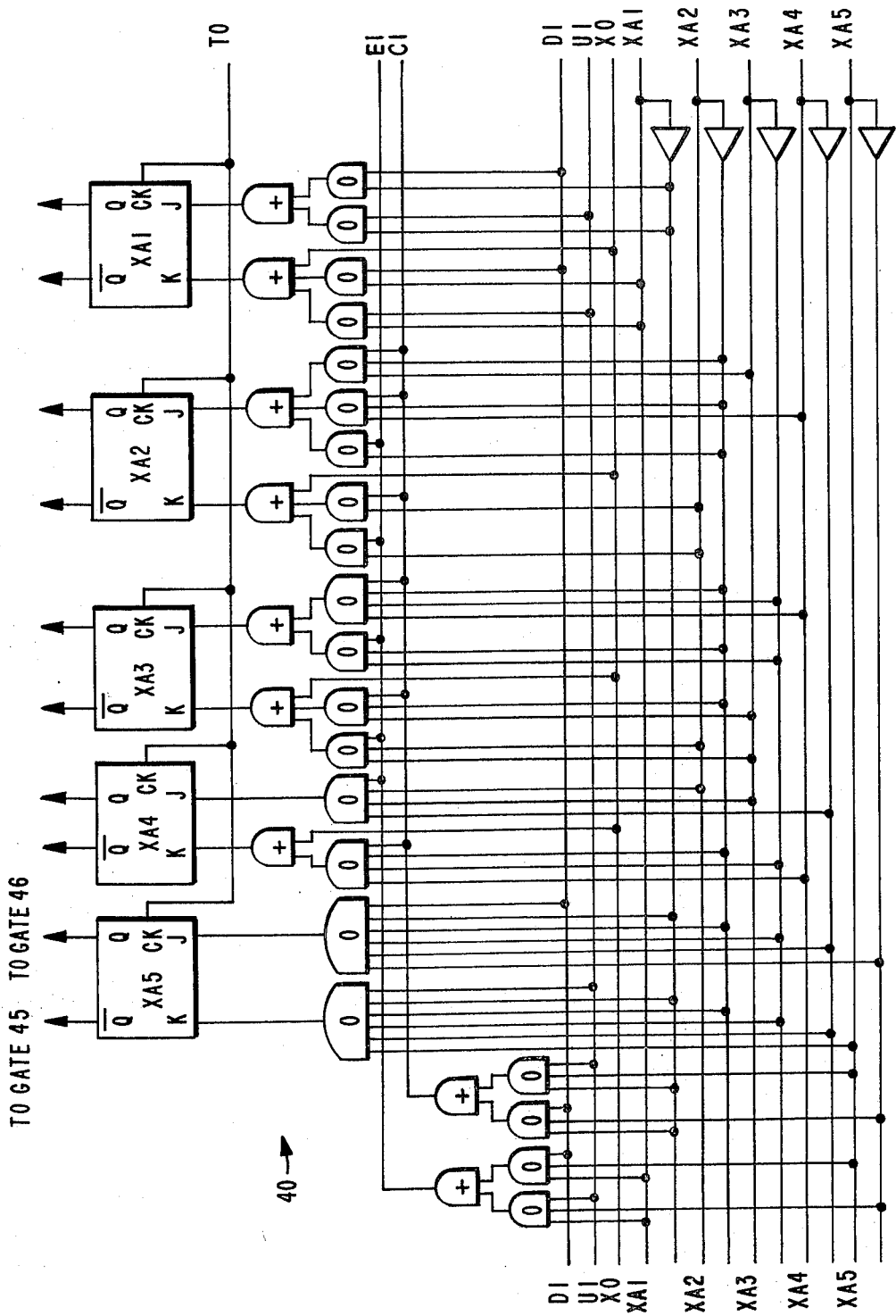
FIG.—3

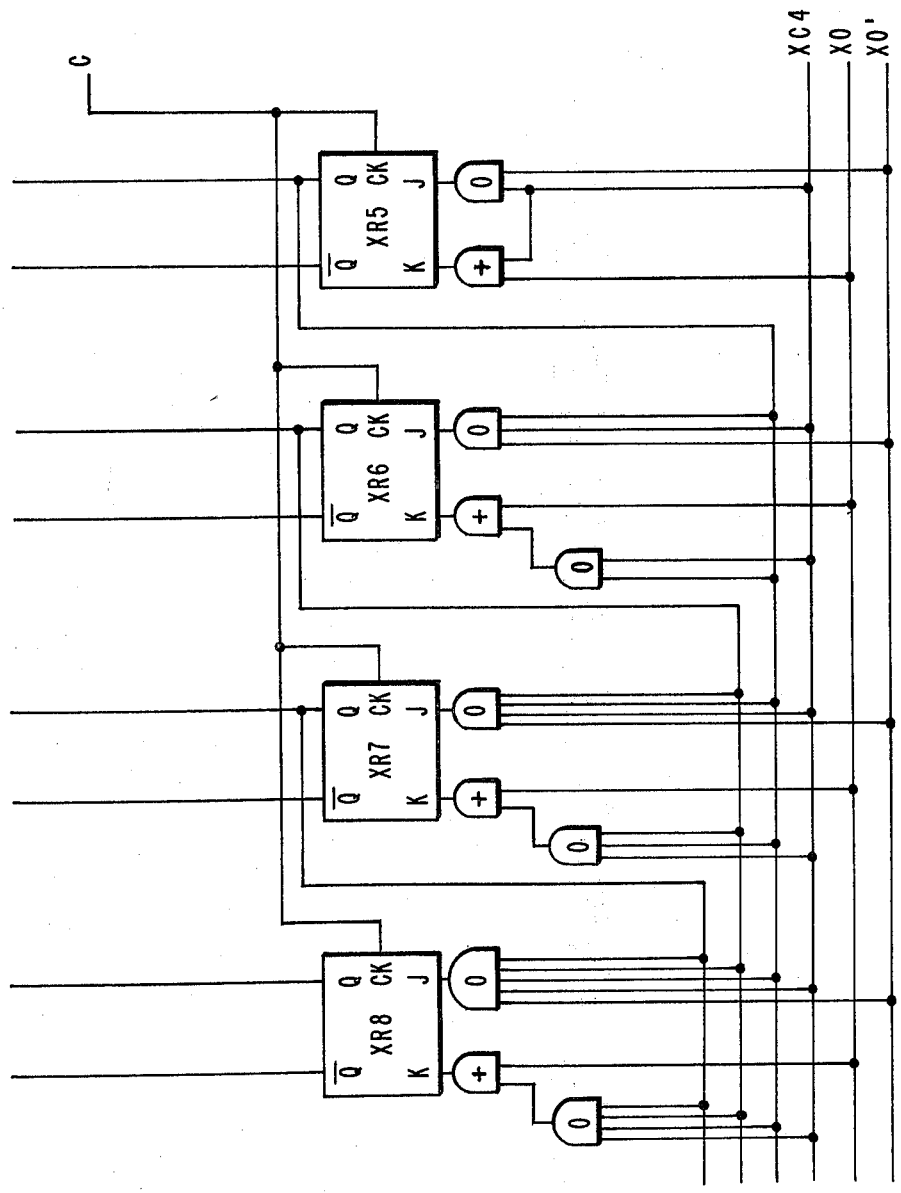
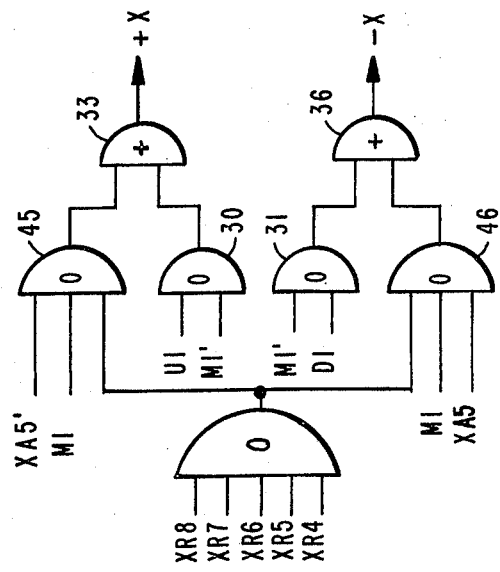
FIG.-5
FIG.-4A | FIG.-4B
FIG.-4

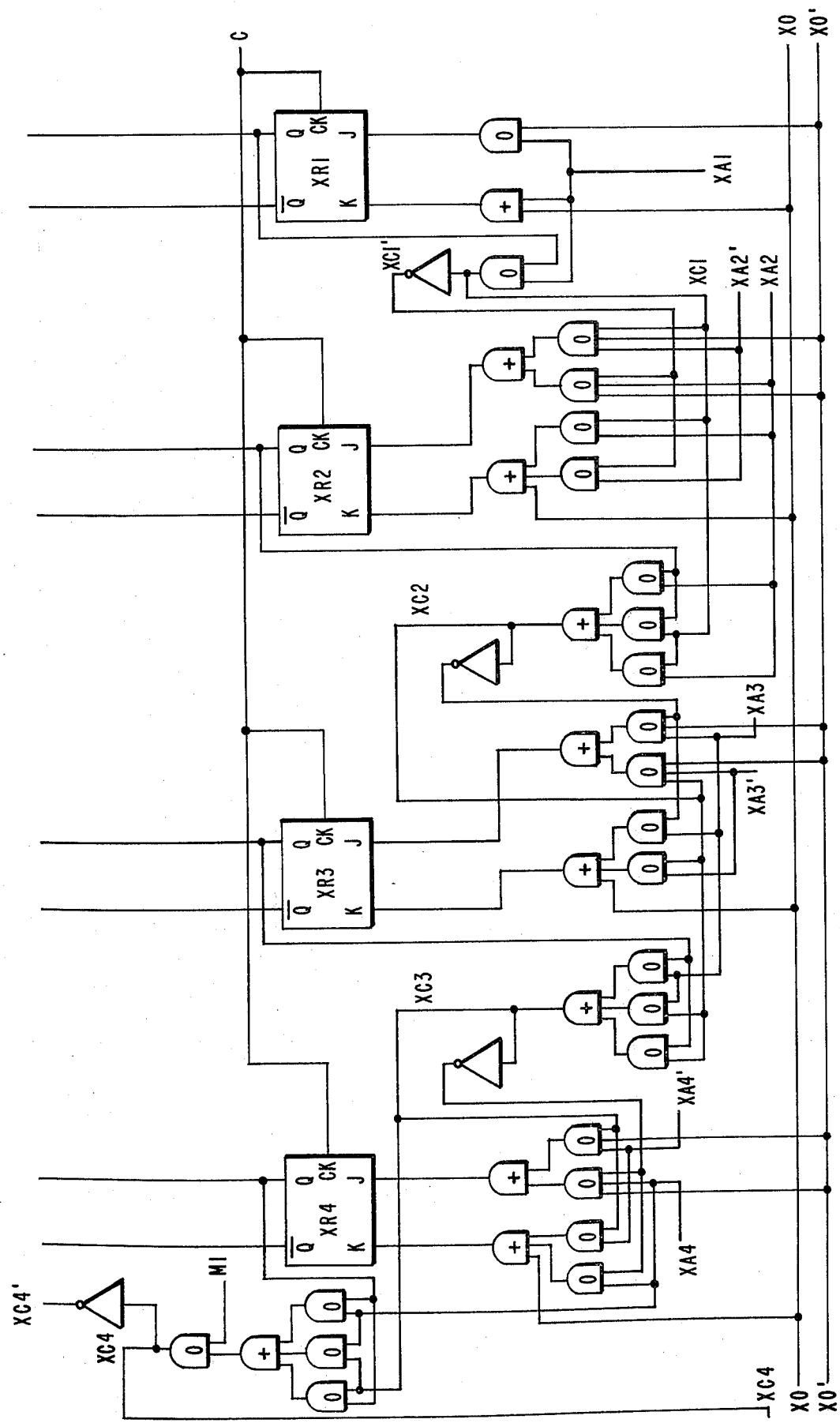
FIG.—4B

DIGITAL INCREMENTAL CONTROL SYSTEM

This invention relates to digital devices and systems and more particularly to incrementally advanced output devices for data processing applications.

A recurrent and difficult problem in the organization of electronic data processing systems is the design and interrelation of output devices and systems so that they can operate with data transfer rates and reliability compatible with the electronic data processing system itself. Because an output device is usually electromechanical in nature, it is usually relatively slow by comparison to the data processing system. Where an output device of this character must be tied directly to the data processing system as the sole controlled output mechanism, the excess speed capability of the data processing system is effectively lost. It is therefore common, with medium and large scale computers, to utilize buffer mechanisms or to operate two or more output systems concurrently from a single data processing system.

Despite the availability of such expedients for utilizing computer time to best advantage, there is always a need for improving the data transfer rates of output devices, as well as further decreasing the temporary or permanent speed incompatibility between a computer and its output devices. A specific example of the type of output device which gives rise to typical problems is provided by graphical plotting systems. Such systems are required to accept digital data from a computer, and to record such data in a visual display, preferably including reference notations, coordinate data, and special identifying information. Thus such systems may be called upon to operate so as to provide both continuous data, such as curves and straight lines, and discontinuous data, such as characters and symbols. Although it is feasible to utilize servo chart recorders together with digital to analog converters, it has been found highly advantageous for most applications to use digital incremental plotters. Such plotters are driven incrementally in either or both of two orthogonal directions, in response to successive incremental commands provided by the data processor. Operated in this way, such plotter systems function as open loop output devices which rely for extreme accuracy solely upon the incrementing mechanism. It has been found that excellent accuracy and adequate speed for most applications can be attained, and that continuous and discontinuous data can be plotted, either directly on-line with a computer or off-Line from a buffer system. When operated in the on-line mode, the digital incremental plotter completes the steps called for by each separate command as the computer is inactive or makes the necessary computations for the next command. Thus it is possible for the computer programmer to select the plotter and to completely control the graphical data which is printed out, and which is best suited to show the significant computed data.

It is evident that this system depends in large measure upon the performance of the incrementing function. Typically stepping motors are used for the X and Y chart axes, the stepping motors having multi-pole rotors, with stators having a different number of poles. The stator windings are energized in different successive patterns to cause incremental rotational advance of the rotor at each succeeding command. Thus electronic command signals are converted to mechanical rotation at high rates of speed, such as 300 steps per second, and with precise control over the stepping increments.

The incrementing function can also be performed by a variety of means, including pawl and ratchet mechanisms, reference disk and servo motor combinations, and clutch and brake mechanisms. All such latter systems, however, encounter basic torque and speed limitations if adequate reliability and uniformity are to be achieved. The acceleration and deceleration of even a small mechanical system in a matter of a few milliseconds cannot economically be accomplished with a high inertia system. Accordingly, stepping rates and incremental distances must be balanced against the available torque, and a compromise best suited to the particular application must be reached. Even under these conditions special precautions may have to be taken to avoid mechanical resonances at certain speeds of operation. Thus, system design involves a number of critical factors and requires that the stepping mechanism be limited to a determinedly nominal speed for arbitrary operation. This nominal speed is the speed at which the stepping mechanism may be reversed in direction without any irregularities in the stepping time or distance.

Such command limitations on the upper nominal speed of a stepping mechanism do not mean that the mechanism cannot be operated faster with reliability, but only that they cannot be operated faster without proper consideration of acceleration and deceleration characteristics. Thus, a stepping mechanism may operate at a considerably higher rate, provided that it is not called upon to reverse direction suddenly. Because of the many circumstances during the preparation of a graphical plotter which require a long term sequence of unvaried commands, the ability of a system to execute these commands substantially more rapidly would result in a much higher effective data rate and consequently more advantageous use of the computer system.

It is therefore an object of the present invention to provide an improved digital incremental plotting system having increased speed capabilities.

Another object of the present invention is to provide an improved system for operating a stepping mechanism at high speed.

A further object of the present invention is to provide improved data processing systems which are capable of plotting data incrementally at high speeds.

Yet another object of the present invention is to provide improved methods of preparing graphical output data in conjunction with a data processin system.

Another object of the present invention is to provide improved techniques for compressing data commands for a data processing output device.

A further object of the present invention is to provide an improved system for increasing the speed capabilities of a standard output system for a data processer.

A further object of the invention is to provide an improved control system for converting commands provided from a data source into commands suitable for controlling a plotting system with high efficiency.

These and other objects are achieved by a system in accordance with the invention which operates an incremental mechanism at time varying rates for continuous data, although permitting direct and asynchronous control for discontinuous data. When movement of the mechanism can be continuous for a time, the system enters a different mode, in which commands for the mechanism constitute increments of velocity. These increments of velocity are then converted into time varying movement command sequences which control acceleration to and deceleration from velocities consistent with the extent of the continuous movement. In consequence, the command sequences for these continuous movements are greatly compressed, while at the same time the operating rate of the controlled mechanism is greatly increased. A further important consequence is that the processing time required of a data processing system is greatly reduced.

In accordance with one aspect of the present invention, a digital incremental plotter may be moved on two axes to provide continuous as well as discontinuous plots. Where the plot commands permit, however, the system enters a slewing mode in which separate directional commands for the two axes of the plotter represent velocity increments. These velocity increments are expanded into distance increments in a precisely related proportion with complete control of the incremental movement. Further, the velocity increments are so converted that the acceleration and deceleration rates are maintained within the capabilities of the incrementing mechanisms. On entering the slewing mode, the plotter operates with synchronized control of both axes of movement, and at frequencies which are integral submultiples or multiples of the basic rate at which data commands are provided. Features of this system are derived from the facts that no essential modification of the stepping or incrementing mechanisms is required, and that the stepping mechanisms are operated asynchronously, or one step at a time in an arbitrary sequence for discontinuous data, whereas they are operated synchronously in controlled acceleration and deceleration fashion for continuous data.

A specific example of a system in accordance with the invention is provided by a digital incremental plotter system having X and Y axis stepping motor controls. Data is provided, one character at a time, at a substantially constant data rate which, however, is subject to speed variations. This data rate is used as a time base for a high frequency clock which generates a harmonic of the basic data rate, and which varies in frequency in accordance with instantaneous speed variations in the data rate. The incoming commands represent incremental movements in either direction along the appropriate axis, and these commands are directed into separate channels, one for each axis. In each channel, the increments are utilized as velocity increment commands, and not equal distance commands. Thus, when the system enters the slewing mode, the data processing system is utilized to prepare the command sequence such as to convert from equal distance increments to the velocity increments. Therefore, the cumulative total of the velocity increments represents velocity, and correspondingly determines distance. To utilize the velocity increments, they are algebraically accumulated in the register as they are provided, and integrated by being added at a high rate of speed, determined by the high speed clock rate, into a digital integrator. The high speed cumulative addition of the velocity increment totals into the digital integrator is divided down into increments of movement by passage through a frequency division system comprising an overflow stage forming part of the digital integrator. Thus, the total count maintained in the accumulating register is reduced to an output pulse sequence which has a pulse repetition rate which is an integral submultiple or multiple of the basic data transfer rate. The multiple or submultiple may be changed in accordance with the contents of the accumulating register, but remains locked to the high speed clock, and therefore to the basic data transfer rate. Consequently, the incrementing mechanisms, which may operate at nominal speeds of 300 steps per second, for example, may be slewed at a much higher speed, such as 1,200 steps per second. Acceleration at the initial portion of the interval and deceleration at the terminal portion of the interval are controlled, to provide a continuous movement with a substantial reduction of both the number of commmands which are required and the time required for plotting.

Methods in accordance with the invention utilize the capabilities of an incrementally driven mechanism and a data processing system in a highly interrelated fashion. Two modes of operation are established in which regular incrementing may be accomplished within the ordinary capabilities of the incrementing mechanism, and within the second of which the high speed continuous operation may be maintained while remaining under positive control.

A better understanding of the invention may be had by reference to the following description, taken in conjunction with the accompanying drawings, in which:

FIG. 3 is a schematic logic diagram of an XA Register including Entry Logic for a control system utilized in the arrangement of FIG. 1;

FIGS. 4, 4A and 4B are schematic logic diagrams of an XR Register, including Entry Logic for a control system utilized in the arrangement of FIG. 1; and FIG. 5 is a schematic logic diagram of a portion of a control system utilized in the arrangement of FIG. 1.

Figure 1:
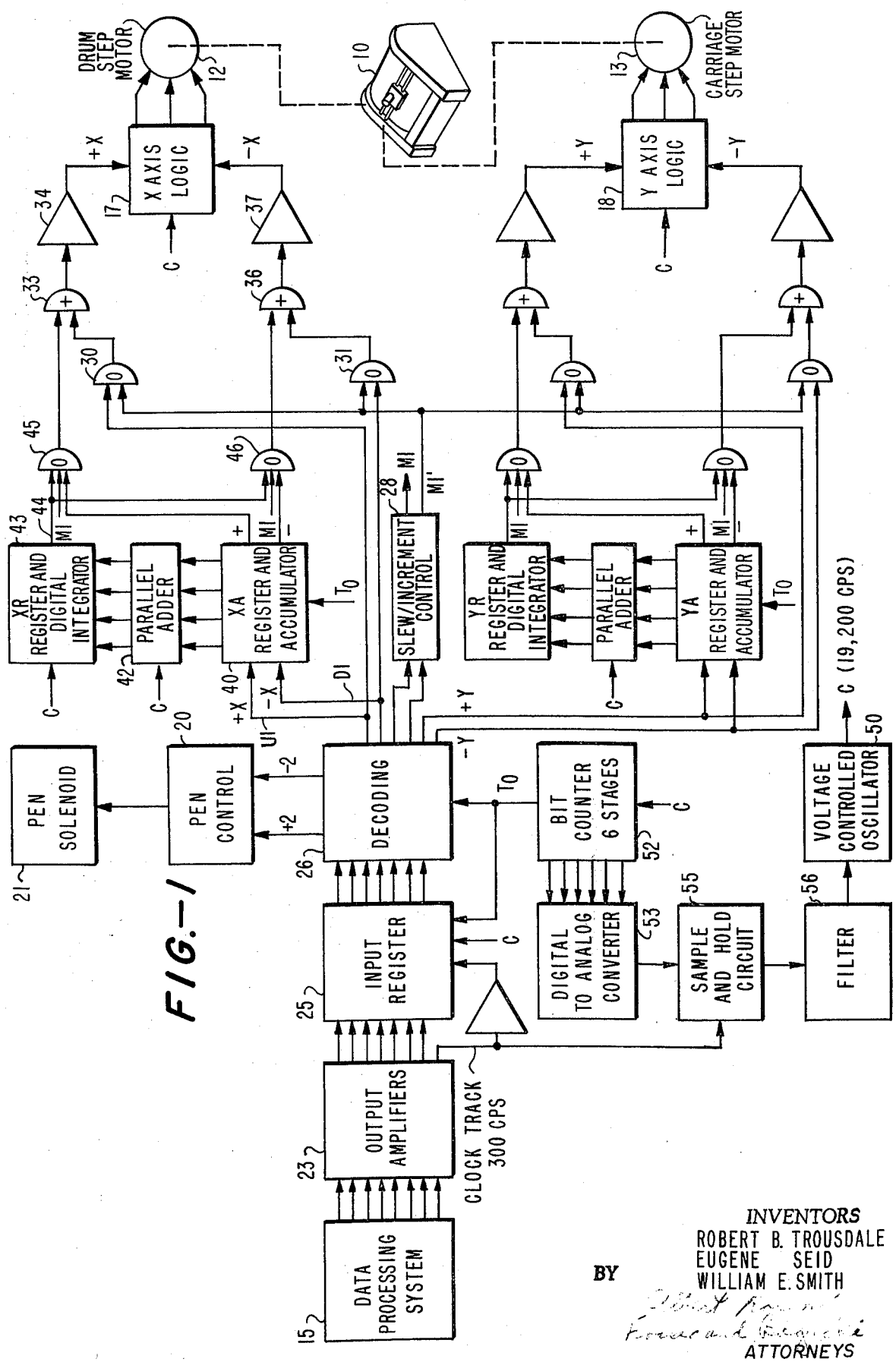
FIG. 1 is a block diagram of a system in accordance with the invention, showing the manner in which the invention may be employed in conjunction with a digital incremental plotter.

The arrangement of a high speed incrementing control system in accordance with the invention is exemplified by FIG. 1, which represents the general arrangement of such a system as applied to a digital incremental plotter 10 of the type now widely used with high speed electronic data processing systems, and having a drum step motor 12 and a carriage step motor 13. This plotter system 10 is capable of operating asynchronously (at arbitrary times and in arbitrary sequences) at high rates, such as 300 steps per second, and in extremely precise fashion, because each step can be a precise and predetermined amount such as 0.01 inches or 0.005 inches. By moving the drum and carriage motors 12, 13 simultaneously, various combinations of movement are realized, such that both continuous line data and discontinuous character or other special data may be presented in arbitrary fashion. With extremely small step increments, and by the use of advanced techniques such as half-step operation in combination with full step operation, permanent graphical records of extreme complexity and accuracy can be prepared under the control of an automatic data processing system. Where large charts, long movements or other conditions require, however, substantial computer time may be taken for essentially repetitive functions. For these conditions, systems in accordance with the invention provide extremely advantageous means for saving time, by operating the plotter 10 in synchronous fashion at much higher rates of speed.

It should be recognized that the drum step motor 12 and the carriage step motor 13 function as asynchronous devices only with given limitations on speed, such as 300 to 350 steps per second, but that these are multi-pole devices which may be operated in synchronous fashion at much higher rates, such as 1500 to 2500 steps per second, provided they are not called upon to reverse within one increment of time or distance. Systems in accordance with the present invention make use of this property of multi-pole step motors, by utilizing commands from a data processing system 15 to establish a slewing mode which drives the plotter 10 within its accelerative limitations. The data processing system 15 merely refers in generalized form to a data source, which may be an electronic data processing system itself, or a storage device such as a magnetic tape transport. While it is not generally economical to use even a high speed plotter 10 directly on-line with a large scale data processing system, it is often convenient to use a number of plotters in this fashion if they are employed in a multiplex manner with other plotters or with other output equipment. It is more conventional and economically justifiable to use the plotter directly on line with a medium or small scale data processing system, but where larger volumes of data are involved the plotter commands are usually stored in a magnetic tape system and thereafter reproduced as needed. Because the magnetic tape system is found to provide an extremely efficient link between a computer and plotter systems, the present example will be concerned with the reproduction of data from a magnetic tape unit at a rate consistent with the synchronous speed capability of the plotter 10. In this example of the invention, the data rate from the data processing system remains the same, e.g. 300 characters per second. The tape is encoded in a standard computer tape format, but special codes are utilized to indicate appropriate plotter commands, with five binary digits of an eight bit code being utilized for plotter movement commands, and one track being utilized to provide a clock pulse from the tape to identify speed variations from the 300 cps rate. A block of information will typically be initiated by a sequence of sync code characters, followed by commands for the X and Y axes, which include commands to identify the incrementing and slew modes. In accordance with programming techniques which have now been highly developed for digital incremental plotters, the slew mode is identified by the programmer at the time of preparation of the program, so that the plotter is merely commanded to enter the slew mode, following which desired commands are given in sequence from the starting coordinate to the terminal coordinate for the slewing mode. The numbers of commands required to traverse a given distance when in the slew mode are desirably greatly less than those required during the incremental or asynchronous mode, and this result is achieved by incrementing systems in accordance with the invention.

In the example of FIG. 1, useful accessory equipment, such as manual controls for the plotter mechanism and accessory circuits and devices have not been shown for simplicity. Similarly, further adaptations of the driving and control systems, such as the half-step feature previously mentioned, have been omitted for simplicity. The X axis logic 17 for controlling the drum step motor 12, and the Y axis logic 18 for controlling the carriage step motor 13 have not been shown in detail, inasmuch as the stepping arrangements which are employed are well known to those skilled in the art. Similarly, the pen control 20 for operating the pen solenoid in up and down movements is well understood, and not of especial significance to the slewing operation, and therefore not described in greater detail.

Data is provided in a standard computer format, utilizing multi-channel output amplifiers 23, and providing 8-bit characters, with one of the bits being employed as a clock track. With data reproduced at the nominal rate of 300 characters per second, the clock track provides an indication on the time base of the actual speed variation in the reproduced data. The reproduced data is gated into and out of an input register 25, under control of the clock track pulses and other clock pulses described below, in conventional fashion. Thereafter, the clock track pulses, the generated clock pulses, and the data are used in highly interrelated fashion to achieve slewing mode operation of the plotter 10.

The data is applied to decoding circuits 26 which will typically comprise conventional diode matrices for converting the input codes into the sync codes, which do not constitute pen or plotter commands, the increment codes, and the X, Y and Z axes codes in either direction of movement. With the conditions described here, five parallel bits, plus the clock track, are all that are required for the various commands, in accordance with the following table:

TABLE I

Space 00000
+ Y 00001
+Y +X 00010
+X 00011
−X+Y 00100
−Y 00101
−Y−X 00110
− Z 00111
+X−Y 01000
Pen Up 01001
Pen Down 01010
Enter Slew 01011
Block Code 01100
Start Plot 01101
Enter Increment 01110
Sync Code 01111

Table I does not include commands for half increment movement, although these may also be accomplished within the five data bit combinations. The decoding circuits 26 provide a +Z, −Z, +X, −X, +Y, −Y and slew and increment control signals on separate output terminals. The pen control signals provided for the Z axis control operate independently and need not be further described. The slew and increment signals are provided to a control, such as the slew incremental control flip-flop 28, and appropriate steady state signals are employed for conditioning AND gates 30, 31, when the increment (M1') signal is provided. In the increment mode, the +X signal is provided from the AND gate 30 through an OR gate 33 and an amplifier 34 to the +X input of the X axis logic 17. The command for the opposite direction of movement is provided from the AND gate 31 through one input of an OR gate 36, and then to the appropriate input of the X axis logic 17 through an amplifier 37.

When the system is in the slew mode, however, the +X, −X, +Y and −y signals are utilized in an entirely different fashion. Inasmuch as the circuits and controls for these two axes are essentially alike, only one will be described in detail, and that in conjunction with the X axis control of the drum step motor 12. The description of the organization and operation must also be considered to apply in like fashion to the Y axis control.

In the X axis control, the +X and −X signals are applied in the slew mode to an XA register and accumulator 40. This circuit is described in greater detail in conjunction with FIG. 2, but comprises means for accumulating increments of velocity, X. As the decoding circuits 26 provide successive X axis commands, signal combinations representative of the cumulative X total are presented by the XA register 40. These cumulative tools are sampled at a much higher rate, determined by the clock pulse C, and applied through a parallel adder 42 into an XR register and digital integrator 43. Broadly stated, the integrated total represents a digital slewing command for the X axis logic 17. Somewhat more specifically stated, the digital integration is effectively achieved by further using an overflow portion of the digital integrator 43 as a digital divider mechanism, under control of the high speed clock C to time average the incoming input signals, and to convert them from a varying sequence of +X and −X (as well as no action) commands, into an averaged sequence of +X or −X commands appropriately distributed along the time base. The output signals are provided as a sequence of pulses at the output terminal 44 of the XR register and digital integrator 43, to both of a pair of AND gates 45, 46, the first of which 45 is conditioned by a +X direction signal from the XA register 40, and the second of which is conditioned by the opposite direction signal from the XA register 40. The output pulses from the XR register 43 occur at some integral multiple or submultiple of the clock track pulses from the data processing system 15, and the multiple may be carried up to some predefined limiting level, so as to achieve the controlled slew operation. By averaging in this manner, the system provides controlled acceleration, as well as controlled deceleration, within the operating response characteristics of the step motor 12 or 13.

The use of the clock pulse generating system contributes significantly to this arrangement. The 300 cps clock track signals are used to maintain the output of a voltage controlled oscillator 50 in synchronism, but at a much higher frequency, here a multiple of 64 times the 300 cps signal, or 19,200 cps. As stated above, this high frequency signal provides a basis for high speed repetitive sampling, and digital division of the cumulative totals which are handled in the XA register 40 and the XR register 43. The voltage controlled oscillator 50 has a nominal frequency of 19,200 cps, which is divided in a six stage binary counter 52 which recycles at count 64. The bit counter 52 includes conventional means for extracting a clock pulse $T_0$ at a frequency of 300 cps for identifying the start of the cycle. Each stage of the bit counter 52 is coupled to a digital to analog converter 53, which may comprise a conventional precision resistor network that generates an analog output voltage representative of the count maintained in the bit counter 52 at any instant in time. As the bit counter 52 recycles, a voltage output from the digital to analog converter 53 changes in stepwise fashion for each change in the count, and this stepwise change in voltage is applied to a sample and hold circuit 55 which is gated under control of the 300 cps clock track pulses. The amplitude of the analog signal at the time of sampling determines the error in the frequency of the voltage controlled oscillator 50, and is accordingly used to correct the frequency of the oscillator 50. The time base variations in the clock track of data from the data processing system 15 are relatively slow varying, however, and so the output signal from the sample and hold circuit 55 is smoothed in a filter 56.

The use of this circuit for generating the clock C not only insures tracking of the clock with reference to the reproduced data signals, but also insures an accurate subdivision of time intervals within the data pulse interval, in order that accurate conversion of the varying or asynchronous input data to synchronous output commands suitable for slewing can be achieved. The clock rate C is determined by the degree of division which is desired within the reproduced data, taken in conjunction with the capacity of the XA and XR registers 40, 43 respectively.

Figure 2:
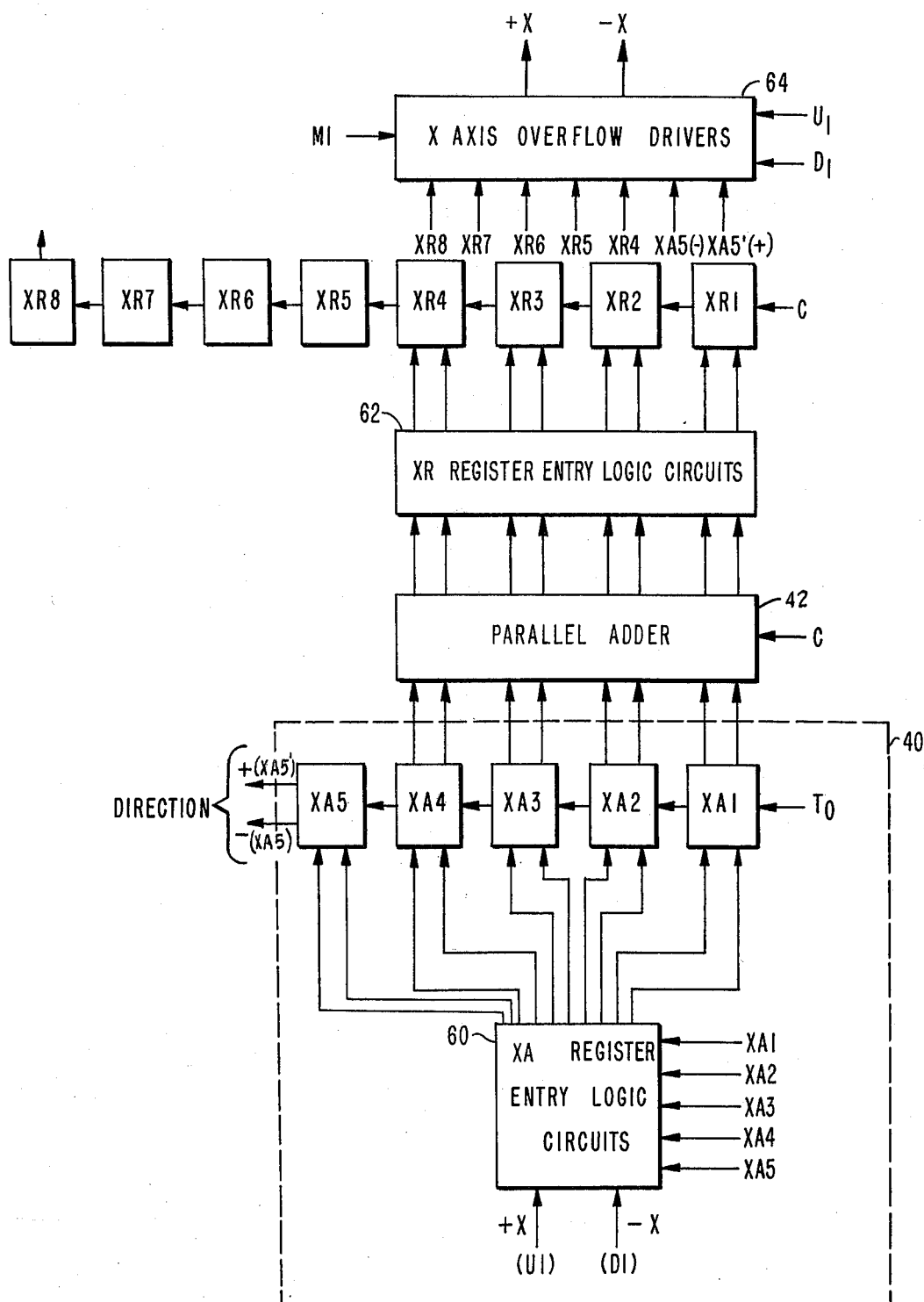
FIG. 2 is a block diagram of a portion of a control system utilized in the arrangement of FIG. 1.

For a better understanding of the details of this arrangement, as pertains particularly to the registers 40, 43 reference should be made to the block diagram of FIG. 2. In this diagram only the separate XA and XR registers are shown. It will be understood that the Y axis controls contain similar units, and also that certain simplifications have been made for clarity. The complete system organization is described, however, in terms of the block diagram of FIG. 2 and the logical equations given hereafter. A group of flip-flops, such as those comprising the XA register and accumulator 40 of FIG. 1 may be controlled by conventional logic circuits in accordance with their own states as well as the input signal combinations. Inasmuch as the wiring of specific circuits is a strictly mechanical function once the logical equations are known and the input conditions are defined, no schematic circuits are necessary for those skilled in the art.

In FIG. 2, the +X and −X signals, designated U 1 and D 1 respectively in conjunction with the logical equations below, are applied to the XA register entry logic circuits 60. The XA register is a five stage flip-flop register, only four stages of which are utilized for accumulation of increments of velocity X, with the fith stage XA 5 being used for direction control or ± indications relative to the X axis. Clock signal $T_0$ causes the contents of the XA Register to be appropriately incremented or decremented in response to the signals U1 and D1 at the nominal 300 cps data rate while clock signal C causes the contents of the XA Register to be cumulatively added into the XR Register at a nominal rate of 19,200 times per second. The logical equations which govern the entry of data into the XA register and accumulator are illustrated schematically in FIG. 3 and presented in Table II as follows:

TABLE II

1XA1 = XA1' U1 + XA1' D1
0XA1 = XA1 U1 + XA1 D1 + X0

1XA2 = XA2' E1 + XA4 XA2' C1 + XA3 XA2' C1
0XA2 = XA2 E1 + XA2 C1 + X0

1XA3 = XA3' XA2 E1 + XA4 XA3' XA2' C1

$0XA3 = XA3\ XA2\ E1 + XA3\ XA2'\ C1 + X0$ $1XA4 = XA4'\ XA3\ XA2\ E1$
$0XS4 = XA4\ XA3'\ XA2'\ C1 + X0$ $1XA5 = XA5'\ XA4'\ XA3'\ XA2'\ XA1'\ D1$
$0XA5 = XA5\ XA4'\ XA3'\ XA2'\ XA1'\ U1$
where
$U1 =$ a positive $V_x$ (UP)
$D1 =$ a negative $V_x$ (DOWN)

$E1 = XA1\ XA5'\ U1 + XA1\ XA5\ D1$
$C1 = XA1'\ XA5'\ D1 + XA1'\ XA5\ U1$

By inspection, or by analysis, it will be observed that each incremented count, X, either positive or negative, is totalled in the XA register, so that a cumulative count of the plus and minus values is maintained. This count is changed by one at the 300 cps rate of the data provided from the tape, but is continually presented for parallel adding into the XR register. The XR register entry logic circuits 62 are used in conjunction with the parallel adder to control the manner in which the XR counts are changed in accordance with the contents of the XA register. The entry is only made into the first four stages of the register, however, inasmuch as the last four stages are primarily an overflow series implied for division of the overflows from the first four stages by a factor of 16. The logic for controlling the XR register, which may be implemented with J-K flip flops, is illustrated schematically in FIG. 4 and presented in Table III as follows:

TABLE III $1XR1 = XA1\ X0'$
$0XR1 = XA1 + X0$
$XC1 = XR1\ XA1$
$XC1' =$ INVERTER
$1XR2 = XA2'\ XC1\ X0' + XA2\ XC1'\ X0'$
$0XR2 = XA2'\ XC1 + XA2\ XC1' + X0$
$XC2 = XR2\ XA2 + XR2\ XC1 + XA2\ XC1$
$XC2' =$ INVERTER
$XR3 = XA3'\ XC2\ X0' + XA3\ XC2'\ X0'$
$0XR3 + XA3'\ XC2 + XA3\ XC2' + X0$
$XC3 = XR3\ XA3 + XR3\ XC2 + XA3\ XC2$
$XC3' =$ INVERTER
$1XR4 = XA4'\ XC3\ X0' + XA4\ XC3'\ X0'$
$0XR4 = XA4'\ XC3 + XA4\ XC3' + X0$
$XC4 = (XR4\ XA4 + XR4\ XC3 + XA4\ XC3)$ (SLEW MODE) M1
$1XR5 = XC4\ X0'$
$0XR5 = XC4 + X0$
$1XR6 = XR5\ XC4\ X0'$
$0XR6 = XR5\ XC4 + X0$
$1XR7 = XR6\ XR5\ XC4\ X0'$
$0XR7 = XR6\ XR5\ XC4 + X0$
$1XR8 = XR7\ XR6\ XR5\ XC4\ X0'$
$0XR8 = XR7\ XR6\ XR5\ XC4 + X0$

It will be noted that the entry logic circuits 62 include various additional gates, designated XO, XC1, XC1' and the like. The XA gate controls entry into the first stage of the XR register, and the XC1 and subsequent gates control carries between successive stages. The XC1' gate is provided merely by an inverted coupling to the XC1 gate. The logic thus defined establishes that, depending upon the count in the first four stages of the XR register, there is a subsequent addition, with carries, of the count from the four stages of the XA register from which data is taken. The logic further establishes that counts in the last four stages are successively overflowed in binary fashion, thus providing division of the integrated value in the first four stages. The signal XO is a reset signal which is synchronized with the $T_0$ clock signal and which is provided in a conventional manner whenever the plotter 10 switches modes or a malfunction is detected.

The output signals from the XR register are the synchronous pulses provided at some sub-multiple or multiple of 300 steps per second, and driving the X axis logic 17 in the appropriate direction. The X axis overflow drivers 64 are controlled by logic illustrated schematically in FIG. 5 and presented in Table IV asa follows:

TABLE IV

X OVERFLOW DRIVERS
$+X = M1\ XR8\ XR7\ XR6\ XR5\ XC4\ XA5' + U1$ (INCREMENTAL MODE) M1'
$-X = M1\ XR8\ XR7\ XR6\ XR5\ XC4\ XA5 + D1$ (INCREMENTAL MODE) M1'

This logic establishes that, when the system is in the slew mode and the last four stages of the XR register are in the "1" valued states, the appropriate command signal is provided depending upon the state of the XA5 stage of the XA register 40. Alternatively, when the M1' or incremental mode signal is provided, the system operates asynchronously in direct response to the U1 and D1 signals.

In the operation of an arrangement of FIG. 2, the $+X(U1)$ and $-X(D1)$ signals are provided at the 300 cps rate of the reproduced data, the clock pulse is applied to the entry gates at the 19,200 cps rate, but the $+X$ and $-X$ control signals are adjusted to some other time base which is a submultiple or multiple of 300 cps. Whereas the input pulses do not cause a continuous sequence of movements in one direction, inasmuch as they may cause interspersed negative and positive movements, as well as no movements, the output signals to the X axis logic 17 via AND gate 45, OR gate 33 and amplifier 34 or AND gate 46, OR gate 36 and amplifier 37 represent a continuous sequence of evenly spaced pulses, until a shift is made in the slewing rate, at which point the repetition rate changes.

In accordance with the invention, the rates of change in the slewing rate are controlled, and are limited to acceleration rates within the capability of the driven step motor. It should be born in mind that desired slewing characteristics, once established, provide a library of sub-routines for the programmer, who thereafter need only utilize the sub-routine suitable for a given purpose. For example, with a given acceleration capability the programmer will cause acceleration to be maintained within tolerable limits by interspersing "no action", commands at selected intervals along a sequence of +X or —X commands. With the no-action command represented by a zero, such a sequence of reproduced data commands for one axis may be as follows:

1110111011101110

In the slewing mode, each data command from the tape or other source represents and controls many steps of the plotter, by a multiple depending upon the relation of the command to the total interval of the slewing mode. As the plotter accelerates up to some desired final speed, then decelerates down to the asynchronous speed or to zero, the significance of a command on the amount of plotter movement varies accordingly. In the operation of the part of the system which is specifically shown in FIG. 2, therefore, the commands are applied to the XA register 40, which is reset at the start of the slew mode to all zeros by XO. At this time there is no overflow in the XR register 43, the system is therefore accelerated from zero. As the count builds up in the XA register 40, however, the count in the XR register 43 builds up at a much faster rate, because it represents 64 accumulations of the contents of the XA register 40 between the time that one command is provided to the XA register 40 and the succeeding command is provided at 300 cps.

For instance, in the present arrangement the plotter will advance $19,200/(300 \times 2^8) = \frac{1}{4}$ step for each cycle of the 300 cps clock for each increment stored in the XA Register and Accumulator 40. Since the XA Register and Accumulator 40 can store a maximum count of 15, each axis of the plotter can have a maximum velocity of 3¾ steps per cycle of the 300 cps clock in the slew mode. Using the sequence of three increments and a space as suggested above, the position of the X axis of the plotter after each cycle of the 300 cps clock can be determined as follows. During Cycle 1 Register 40 will store a 1 and advance one-fourth step. During Cycle 2 the Register 40 will store a 2 and advance one-half step further for a total of three-fourths step. An additional three-fourths step increment in both Cycle 3 and 4 will result in a total of 2¼ steps. In this manner the position of the X axis can be determined at the end of any cycle. Acceleration to the maximum velocity using the suggested incrementing or decrement pattern is illustrated in Table V below:

TABLE V

| Cycle | Steps per Cycle | Total Steps |
|---|---|---|
| 1 | ¼ | ¼ |
| 2 | ½ | ¾ |
| 3 | ¾ | 1½ |
| 4 | ¾ | 2¼ |
| 5 | 1 | 3¼ |
| 6 | 1¼ | 4½ |
| 7 | 1½ | 6 |
| 8 | 1½ | 7½ |
| 9 | 1¾ | 9¼ |
| 10 | 2 | 11¼ |
| 11 | 2¼ | 13½ |
| 12 | 2¼ | 15¾ |
| 13 | 2½ | 18¼ |
| 14 | 2¾ | 21 |
| 15 | 3 | 24 |
| 16 | 3 | 27 |
| 17 | 3¼ | 30¼ |
| 18 | 3½ | 33¾ |
| 19 | 3¾ | 37½ |

Using the suggested pattern, it thus takes 19 cycles and 37½ steps to accelerate to maximum velocity. Using a similar technique it can be determined that deceleration from maximum velocity to zero velocity requires 19 cycles and 33¾ steps. A maximum velocity subroutine can thus be established for use any time the distance an axis is to be moved exceeds 51¼ steps. The number of cycles or space commands between acceleration and deceleration would be the total number of steps less 51¼ divided by 3¾.

The advantages of systems in accordance with the invention will now be apparent. Although described in conjunction with the given context of a digital incremental plotter operating in conjunction with a constant speed data source, it will be recognized that it need not be so employed. A wide variety of other incrementally movable mechanisms operating under digital control will present themselves to those skilled in the art, including numerically controlled machine tools, digitally controlled servo mechanisms and the like. It should be noted particularly that there is a substantial compression in both the data required to present a particular output display, and in the time required to accomplish the same results. It has been found in practice that the preparation of programs for the use of an output device such as a digital incremental plotter is facilitated, and particularly that the amount of computer time needed is greatly reduced. It must be recognized that the slewing mode can be entered arbitrarily at the discretion of a programmer. Thus, in one practical example, it was determined that any continuous line plots in excess of three-eights inches in length would utilize the slew mode. While this has been found to be extremely productive, a variety of rules and requirements may be adopted to govern entry into the slew mode. It should be noted also that on deceleration, the incremental mechanisms need not be brought down to zero, but can be returned to the asynchronous operating speed and then switched directly into the incrementing mode.

Particular advantages of using velocity increments to control movements in the slewing mode should be fully understood. The velocity increments accumulate at limited rates, controlled in positive fashion by insertion of no-action and opposite direction commands into the command sequence. Thus, acceleration and deceleration are limited to the capabilities of the plotter motor. Because all of the data is digital, and repetitive in nature, these functions are carried out as a matter of routine under the control of the programmer.

The methods in accordance with the invention may be achieved by a number of examples, although a preferred mechanism is shown. The organization of the commands so that distance increments are used for regular stepping modes and velocity increments are used for slewing modes is an important part of the method. It should be noted, however, that the data organization does not affect either the signal reproducing system or the plotter. It will also be recognized that other methods of accumulating averages and affecting integration of the accumulative totals may be utilized.

What is claimed is:

1. The method of providing digital incremental graphical plots from a data processor which includes the steps of providing distance increment and velocity increment commands in separate series from the data processor, operating a plotter at rates synchronized with distance increment commands as they are provided in one series, and operating the plotter at rates which vary with time in accordance with the velocity increment commands as they are provided in the other series.

2. The method of providing digital incremental graphical plots from data provided from a data processor which includes the steps of providing data commands in spaced binary digital character form at a known data transfer rate, the commands occurring in either of two separate series, a first type of series comprising distance increment commands, and a second type of series comprising velocity increment commands, operating a plotter at a rate synchronized with the distance increment commands as they are provided, converting the velocity increment commands to distance increment commands occurring at varying pulse repetition rates which are integral submultiples or multiples of the known data rate, and operating the plotter at the varying pulse repetition rates.

3. The method of driving a graphical output device through a desired program with compressed data including the steps of providing incremental distance-representative commands for the graphical output device for portions of the program which do not contain essentially continuous graphical data, and providing velocity-representative commands which define compressed directional commands along two axes for the graphical output device for portions of the program which contain essentialy continuous graphical data.

4. The method of controlling a graphical output device with compressed data provided serially by character to drive a graphical output device which operates incrementally in response to separate commands through a desired program, the method including the steps of providing incremental distance-representative data characters for the graphical output device for portions of the program which do not contain essentially continuous graphical data, providing velocity-representative data characters which define compressed directional commands along two axes for the graphical output device for portions of the program which contain essentially continuous graphical data, and expanding the compressed commands into command sequences for the graphical output device.

5. The method of operating a stepping mechanism in regular stepping and slewing modes which includes the steps of providing a succession of regularly time-spaced velocity increment commands, cumulatively totaling the commands, and converting the cumulatively totalled commands to a succession of equal increment commands of controlled repetition rate.

6. The method of operating a stepping mechanism in regular stepping and slewing modes which includes the steps of providing a succession of regularly time-spaced commands, the commands being provided in either of two series, a first series comprising regular stepping commands, and the second series comprising velocity increment commands for the slewing mode, operating the stepping mechanism directly from the regular stepping commands, cumulatively averaging the velocity increment commands, converting the cumulatively averaged commands to a succession of increment commands of variable and controlled repetition rate, and operating the stepping mechanism from the variable repetition rate commands during slewing modes.

7. The invention as set forth in claim 6 above, wherein the variable repetition rate commands are provided at integral subumultiples and multiples of the initial command rate, and wherein changes between the various command rates during the slewing mode are limited to rates within the acceleration and deceleration capabilities of the stepping mechanism.

8. The method of driving a stepping mechanism which includes the steps of providing velocity increment commands and converting the velocity increment commands to time rate varying increment commands.

9. The method of driving a mechanism which is movable in equal increments along an axis from separate commands, including the steps of providing a succession of digital velocity increment commands at a substantially fixed rate and converting the velocity increment commands to a succession of digital increment commands, each for a stepping movement, the digital increment commands being provided at varying time rates which vary in steps harmonically related to the substantially fixed rate.

10. The method of operating a controlled incrementally movable mechanism under separate digital commands which includes the steps of providing a succession of digital commands representing velocity increments, continually accumulating the velocity increments, and forming commands representing equal increments of movement which vary in rate in response to the accumulated velocity increments.

11. The method of operating a controlled, incrementally movable, mechanism under control of a succession of separate digital commands, each comprising a character representing incremental movements desired for the mechanism, the method of including the steps of identifying a given succession of the digital commands as velocity increments desired for the controlled mechanism, algebraically accumulating the velocity increments at a high rate of speed relative to the movement of the controlled mechanism, converting the accumulated velocity increments to equal increment commands being provided at a time varying rate determined by the accumulated velocity increments, and operating the controlled mechanism synchronously at the time varying rate determined by the equal increment commands.

12. The method of operating a stepping mechanism at varying speeds from a succession of input commands including providing a succession of movement commands, the sequence of the commands representing velocity variations desired for the stepping mechanism, integrating the movement commands and deriving a succession of stepping commands which vary at rates dependent upon the integrated movement commands.

13. The method of operating a stepping mechanism which includes the steps of providing successive regular stepping and slewing mode command sequences, each of the command sequences comprising a series of step commands representing a different characteristic dependent upon the mode of operation, separately identifying the mode of operation, and operating the stepping mechanism in equal distance increments but at different rates in response to the command sequences provided in the slewing mode.

14. The method of operating a digital incremental plotter which includes the steps of providing digital commands for the two axes of movement, stepping the plotter in synchronism with the commands and in movements having direct correspondence to the commands in a first mode, identifying a second, slewing mode of operation, utilizing the commands as velocity increments during the second mode, and driving the plotter at varying rates dependent upon the velocity increments.

15. The method of operating a digital incremental plotter having X and Y axis stepping mechanisms which includes the steps of providing a sequence of digital commands at a substantial fixed frequency for controlling movement relative to the two axes, the commands comprising separate characters encoded to represent directional movement, stepping the plotter in one-to-one synchronism with the commands and in movements having direct correspondence to the commands in a first mode, identifying a second, slewing mode of operation, utilizing the commands as velocity increments during the second mode, integrating the velocity increments during the second mode, for both axes, establishing a reference frequency for both axes which is an integral multiple of the rate at which the initial digital commands are provided, subdividing the reference frequency to a harmonically related lower frequency for each axis dependent on the integrated value of velocity increments for the axis, and driving the plotter on each axis in a synchronous manner at a rate dependent upon the varying frequency.

16. The method of controlling a digital incremental plotter to minimize the number of individual commands required for a given plot which includes the steps of providing a succession of commands having one-to-one correspondence to plotter movements for plot portions of a discontinuous nature, and providing a succession of commands which cumulatively identify desired plotter velocity for plot portions of a substantially continuous nature, and identifying the two types of successions of commands.

17. A data processing system comprising the combination of means providing a series of characters at a fixed data transfer rate, the characters comprising either of two series, a first series representing increment commands and a second series representing velocity commands, and means coupled to receive the commands and operate responsively thereto, said coupled means operating at the data rate of said increment commands and at a variable rate in response to said velocity commands.

18. A data processing system comprising the combination of means providing a series of reproduced binary characters at a fixed nominal data transfer rate, the characters comprising either of two series, a first series representing increment commands and a second series representing velocity commands, means for generating a clock pulse from the reproduced characters, control means coupled to receive the commands and operate responsively thereto, said means operating at the data rate of said increment commands and at a variable rate in response to said velocity commands, and means coupled to receive said reproduced characters and to operate said control means at a frequency which is a synchronized multiple of the actual data transfer rate.

19. A system for preparing graphical output data from input data comprising a computer including means to provide a succession of data including incremental velocity commands as output commands, an incrementally variable output device coupled to receive the output commands, and means coupling the computer and the output device and including a control system responsive to the content of the output commands for selectively varying the speed of operation of the output device in response to the individual commands from the computer.

20. A system for controlling an output device from regularly spaced data commands comprising the combination of means for identifying substantially continuous sequences of desired operations in the output device; means responsive to the successive commands in the identifying sequence for accumulating the values thereof; means responsive to the accumulated values for digitally integrating said values, and means responsive to the digitally integrated values for commanding the output device with varying repetitive command pulses in a continuous sequence.

21. A system for preparing graphical output data from input data comprising a computer including means to provide a succession of data as output commands, an incrementally variable output device coupled to receive the output commands, and control means coupling the computer and the output device and including digital integrator means responsive to the content of the output commands for selectively varying the speed of operation of the output device in response to the individual commands from the computer.

22. A system for providing graphical output date from reproduced data comprising the combination of means for reproducing data at a selected substantially constant data rate, the reproduced data including means of identifying high speed portions containing incremental velocity commands, means responsive to the high speed portions for generating variable pulse rate sequences in response to the contents thereof, and means for driving the output device in response to the variable pulse rate sequence.

23. A control system for converting regularly time spaced commands to variable pulse rate commands, the regularly time spaced commands being binary-valued signal combinations representing directional variations occurring at a selected regular clock rate, the system comprising directional digital integrator means and adder means for totaling the regularly time spaced commands, parallel adder means coupling the adder means to the digital integrator means, means operating the parallel adder means at a rate which is an integral multiple of the regular clock rate, and means coupled to the digital integrator means for providing variable repetition rate pulses in accordance with the contents of the digital integrator means.

24. A control system for converting regularly time spaced commands to variable pulse rate commands, the regularly time spaced commands having directional sense and a selected clock rate, the system comprising means for counting increments of directional sense of the regularly spaced commands, digital integrator means, adder means coupled to add the contents of said means for counting, means for adding the contents of the adder means to the digital integrator means at a rate which is an integral multiple of the selected clock rate, and means coupled to the digital integrator means for providing variable repetition rate pulses in accordance with the contents of the digital integrator means.

25. A graphical plotter system comprising the combination of a source of incremental position commands and incremental velocity commands, an incrementally variable plotter, and means responsive to the incremental position and velocity commands for generating variable rate driving pulses for the plotter dependent upon the sequence of the commands.

26. A graphical plotter system comprising the combination of a source of incremental position commands, a digital incremental plotter having X and Y axes, and means responsive to the incremental position commands for generating variable rate driving pulses for the plotter dependent upon the sequence of the commands, said means for generating comprising a pair of digital integrater means, one for each axis.

27. A digital incremental plotter system comprising the combination of a digital incremental plotter having X and Y axis controls and including separate stepping motors for each of the axes, data source means providing a plurality of data characters at a substantially fixed rate, the data characters each including a clock pulse and plotter command digits for each of the axes, and code combinations identifying slew and increment modes, and a control system for operating the plotter in response to the character commands, the control system including variable frequency clock means coupled to receive the clock pulses and to provide a fixed frequency clock signal which is an integral multiple of the clock pulse rate, and a pair of channels, one for each axis, each of the channels including register means for totaling the commands, digital integrator means having a plurality of overflow stages and data receiving stages, parallel adder means coupling the register means to the data receiving stages of the digital integrator means, and means responsive to the overflow from the digital integrator means for operating as the appropriate axis of the plotter means.

28. The invention as set forth in claim 27, wherein the control system includes high frequency clock means synchronized to the clock pulse rate at an integral multiple thereof.

29. A digital incremental plotter system comprising the combination of a digital incremental plotter having X and Y axis controls and including separate stepping motors for each of the axes, each stepping motor being of the type having a multi-pole rotor and a multi-pole stator, and including means for sequentially energizing the motor to step in either direction, data source means providing a plurality of data characters at a substantially fixed rate, the data characters each including a clock pulse and plotter command digits for each of the axes and code combinations identifying slew and increment modes, a control system for operating the plotter in response to the character commands, the control system including variable frequency clock means coupled to receive the clock pulses and to provide a fixed frequency clock signal which is an integral multiple of the clock pulse rate and a pair of channels, one for each axis, each of the channels comprising a decoder means for converting the code characters to increment commands, means responsive to the increment commands and integrator means for totaling the increment commands, said means including a predetermined number of stages, the last stage of which provides plotter direction signals, register means, digital integrator means having a plurality of overflow stages and data receiving stages, parallel adder means coupling the register means to the data receiving stages of the digital integrator means, means including high frequency clock pulse means for operating the parallel adder means to add the contents of the register means into the digital integrator means at each high frequency clock pulse, and means responsive to the overflow from the digital integrator means for operating the appropriate axis of the plotter means.

* * * * *

UNITED STATES PATENT OFFICE
CERTIFICATE OF CORRECTION

PATENT NO. : 3,887,796
DATED : June 3, 1975
INVENTOR(S) : Robert B. Trousdale et al It is certified that error appears in the above--identified patent and that said Letters Patent are hereby corrected as shown below:

Column 1, line 49, "off-Line" should read --off-line--.
Column 2, line 50, "processin" should read --processing--.
Column 6, line 42, "-Z" should read -- -X --. Column 7, line 4, "-y" should read -- -Y --; line 19, "tools" should read --totals--. Column 8, line 47, "fith" should read --fifth--. Column 9, line 4, the equation should read $$0XA4 = XA4 \ X \ A3' \ X \ A2' \ C1 + X0$$

Column 9, line 43, the equation should read $$1XR3 = XA3' \ XC2 \ X0' + XA3 \ XC2' \ X0'$$

Column 9, line 44, the equation should read $$0XR3 = XA3' \ XC2 + XA3 \ XC2' + X0$$

Column 10, line 15, "asa" should read --as--, line 56, after "no action" delete the comma (","). Column 12, line 29, "no-action" should read --no action--.

Signed and Sealed this eleventh Day of May 1976

[SEAL]

Attest:

RUTH C. MASON
Attesting Officer

C. MARSHALL DANN
Commissioner of Patents and Trademarks